(12) United States Patent
Zhang et al.

(10) Patent No.: US 9,244,979 B2
(45) Date of Patent: Jan. 26, 2016

(54) DETERMINING PREDICATE SELECTIVITY IN QUERY COSTING

(75) Inventors: Ning Zhang, Palo Alto, CA (US);
Thomas Baby, Maple Valley, WA (US);
Nipun Agarwal, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1086 days.

(21) Appl. No.: 12/127,971

(22) Filed: May 28, 2008

(65) Prior Publication Data

US 2009/0299989 A1 Dec. 3, 2009

(51) Int. Cl.
*G06F 17/30* (2006.01)

(52) U.S. Cl.
CPC ................................ *G06F 17/30469* (2013.01)

(58) Field of Classification Search
CPC ................................................. G06F 17/30469
See application file for complete search history.

(56) References Cited

U.S. PATENT DOCUMENTS

| | | | |
|---|---|---|---|
| 5,899,986 A | 5/1999 | Ziauddin | |
| 6,029,163 A | 2/2000 | Ziauddin | |
| 6,105,020 A * | 8/2000 | Lindsay et al. | 1/1 |
| 6,275,818 B1 * | 8/2001 | Subramanian et al. | 1/1 |
| 6,775,662 B1 * | 8/2004 | Witkowski et al. | 1/1 |
| 6,947,927 B2 * | 9/2005 | Chaudhuri et al. | 1/1 |
| 7,213,012 B2 | 5/2007 | Jakobsson et al. | |
| 7,458,066 B2 | 11/2008 | Rhine | |
| 7,636,731 B2 | 12/2009 | Cruanes et al. | |
| 7,958,113 B2 * | 6/2011 | Fan et al. | 707/718 |
| 8,386,450 B2 * | 2/2013 | Simmen | 707/705 |
| 2002/0194157 A1 | 12/2002 | Zait et al. | |
| 2003/0018618 A1 | 1/2003 | Bestgen et al. | |
| 2003/0084025 A1 * | 5/2003 | Zuzarte | 707/2 |
| 2003/0149702 A1 | 8/2003 | Saffer et al. | |
| 2004/0215626 A1 | 10/2004 | Colossi et al. | |
| 2004/0225639 A1 | 11/2004 | Jakobsson et al. | |
| 2004/0267713 A1 | 12/2004 | Chaudhuri et al. | |
| 2005/0234841 A1 * | 10/2005 | Miao et al. | 707/1 |
| 2005/0240624 A1 * | 10/2005 | Ge et al. | 707/104.1 |
| 2005/0251511 A1 | 11/2005 | Shankar et al. | |
| 2006/0206507 A1 | 9/2006 | Dahbour | |
| 2008/0120321 A1 * | 5/2008 | Liu et al. | 707/102 |

(Continued)

OTHER PUBLICATIONS

Samir Kapoor et al., "Understand column group statistics in DB2", DeveloperWorks, Dec. 21, 2006, 41 pages.

(Continued)

*Primary Examiner* — Sherief Badawi
*Assistant Examiner* — Sabana s Rahman
(74) *Attorney, Agent, or Firm* — Hickman Palermo Becker Bingham LLP; Daniel D. Ledesma

(57) ABSTRACT

Techniques for estimating a cost of executing a query are provided. A query includes multiple predicates, each of which is associated with a selectivity value that indicates a percentage of input that satisfies the condition of the corresponding predicate. The selectivity values are used to determine an estimated cost of executing the query. In one technique, a group of multiple predicates of a query are treated as a single predicate. Thus, a single selectivity value, rather than multiple selectivity values, is determined for that group. In a related technique, instead of determining a selectivity value of a predicate in isolation with respect to other predicates of a query, the selectivity value of a set of one or more predicates in a query is generated based on other predicates in the query.

32 Claims, 3 Drawing Sheets

(56) References Cited

U.S. PATENT DOCUMENTS

| | | |
|---|---|---|
| 2008/0222087 A1* | 9/2008 | Balmin et al. ............... 707/2 |
| 2009/0018992 A1* | 1/2009 | Zuzarte et al. ............... 707/2 |
| 2009/0150336 A1 | 6/2009 | Basu et al. |
| 2009/0150413 A1 | 6/2009 | Basu et al. |
| 2010/0030728 A1 | 2/2010 | Chakkappen et al. |

OTHER PUBLICATIONS

Proteau, C., "Guide to Performance and Tuning: Query Performance and Sampled Selectivity" Feb. 2004 (22 pages).

* cited by examiner

NODE TREE 102

SYNOPSIS TREE 104

DETERMINING PREDICATE SELECTIVITY IN QUERY COSTING

CROSS-REFERENCE TO RELATED APPLICATIONS

This application is related to U.S. patent application Ser. No. 10/884,311 filed on Jul. 2, 2004, entitled "Index For Accessing XML Data", the contents of which are incorporated by reference as if fully disclosed herein.

FIELD OF THE INVENTION

The present invention relates to database systems, and in particular, to optimization of queries executed by a database system.

BACKGROUND

XML data management has attracted great attention in the recent decade both in the academia and in the industry. Unlike in the relational data model, where the schema (e.g., number of columns, the data type of each column, and the semantic constraints on those columns) needs to be predefined, XML allows data to be organized in a schema-less fashion as long as the data remains in a hierarchical tree structure. Due to its flexibility to model such semi-structured data, XML has been used extensively in many business settings that require data exchanges between different organizations. However, also due to the flexibility of the XML data model, query processing on XML data is usually less efficient than query processing on data stored relationally.

XML indexes help speed up XML data access. One such XML index is described in U.S. patent application Ser. No. 10/884,311, which is referenced above. This XML index includes a relational table, referred to herein as a path table, to capture properties of indexed XML elements in one or more XML documents. Each property corresponds to a column in the path table. Secondary indexes, such as B-tree indexes, may be created on the columns of the path table.

When a query is submitted against indexed XML data, the query is, if necessary, first rewritten into SQL on the path table. The query rewrite is automatically performed by a relational database management system (RDBMS) in order to guarantee that the semantics of the query is equivalently expressed using SQL on the columns in the path table. In this way, existing relational techniques (e.g., a query optimizer selecting the "best" of multiple plans) are exploited to speed up XML query processing.

The schema of the path table is defined as follows:

| Column Name | Data Type |
|---|---|
| RID | ROWID |
| PATHID | RAW(8) |
| ORDER_KEY | RAW(1000) |
| LOCATOR | RAW(2000) |
| VALUE | VARCHAR2(4000) |

In one implementation, each row in the path table corresponds to one element in an XML document. Each column in the path table represents some property of the XML element, which element may be a node or attribute.

In this example, the PATHID column represents an identifier of the rooted path of an element, which column may be used to answer an XML path expression. The ORDER_KEY column represents a unique identifier of an element. The ORDER_KEY column may be used to answer structural relationships (e.g., parent-child, ancestor-descendant, precedence in document order) between elements.

For example, an XML index is created on XML auction documents (referred to collectively as XMARK_CSX). The following SQL/XML query is submitted against XMARK_CSX to identify the person's name whose ID is "person0".

```
SELECT S.NAME
FROM XMARK_CSX T,
     XMLTABLE('/site/people/person' PASSING T.OBJECT_VALUE
         COLUMNS  NAME VARCHAR2(40)
                   PATH '/person/name/text( )',
                   ID  VARCHAR2(40) PATH '/person/@id') S
WHERE S.ID = 'person0';
```

QUERY EXAMPLE 1

Given the XML index created on XMARK_CSX, Query Example 1 is rewritten, using the path table (named XMARK_CSX_IDX_PT in this example), into the following SQL statement:

```
1.  SELECT CAST(
2.         (SELECT P3.VALUE VAL
3.          FROM XMARK_CSX_IDX_PT P3
4.          WHERE P3.RID = A_4.RID AND
5.                P3.ORDER_KEY >= A_4.ORDER_KEY AND
6.                P3.ORDER_KEY <
                      SYS_ORDERKEY_MAXCHILD
                      (A_4.ORDER_KEY) AND
7.                P3.PATHID = PATHTOID('/site/people/person/name')
                      AND
8.                SYS_XMLI_LOC_ISTEXT
                      (P3.LOCATOR,P3.PATHID) = 1
9.         ) AS VARCHAR2(40) ) "NAME"
10. FROM XMARK_CSX T,
11.      XMARK_CSX_IDX_PT A_4,
12.      XMARK_CSX_IDX_PT P6
13. WHERE P6.VALUE = 'person0' AND
14.       P6.RID = A_4.RID AND
15.       P6.ORDER_KEY > A_4.ORDER_KEY AND
16.       P6.ORDER_KEY < SYS_ORDERKEY_MAXCHILD(A_4.
                ORDER_KEY) AND
17.       SYS_ORDERKEY_DEPTH(P6.ORDER_KEY) =
                SYS_ORDERKEY_DEPTH(A_4.ORDER_KEY)+1
          AND
18.       P6.PATHID = PATHTOID('/site/people/person/@id') AND
19.       SYS_XMLI_LOC_ISNODE(P6.LOCATOR)=1 AND
20.       T.ROWID = A_4.RID AND
21.       A_4.PATHID = PATHTOID('/site/people/person') AND
22.       SYS_XMLI_LOC_ISNODE(A_4.LOCATOR) = 1;
```

QUERY EXAMPLE 2

In Query Example 2, there are three references to the path table (A_4, P3, and P6). Due to the predicates on the PATHID column (see lines 7, 18 and 21), these three path table references represent, respectively, elements with a particular rooted path (i.e., A_4 corresponds to elements under/site/people/person, P3 corresponds to elements under/site/people/person/name, and P6 corresponds to elements under/site/people/person/@id). These path table references are "joined" on the ORDER_KEY columns (lines 5-6 and 15-17) to express the parent-child relationships between these elements. Each of these predicates, together with the predicates on the RID and LOCATOR columns, jointly express the constraints specified by Query Example 1.

Because Query Example 2 is a relational query, a query optimizer may enumerate multiple execution plans and select the "best" execution plan in terms of, e.g., estimated cost. Estimated cost may be based on numerous factors, such as an estimated time to process the query and an estimated number of resources that are required to process query.

During the costing process, one of the tasks for the query optimizer is to estimate the selectivity of the predicates in the WHERE-clause. The selectivity of a predicate refers to a portion of input that may satisfy the predicate. In some cases, the selectivity of a predicate is known precisely at query optimization. In other cases, the selectivity of a predicate may be an educated guess. The selectivity of each predicate is used to estimate the cardinality of the query (e.g., the number of results). In query costing, the higher the selectively of a predicate, the higher the percentage of input satisfies the predicate.

Query optimizers typically operate under the assumption that each predicate in a query is independent of the other predicates in the query. For example, a query optimizer assumes that the selectivity of the range condition on the ORDER_KEY column is not related to the selectivity of the equality predicates on the PATHID column. Under this independency assumption, the combined selectivity of all the predicates is simply the multiplication of the selectivities of the individual predicates. In many cases, such an independency assumption causes great errors in the selectivity estimation, which errors may ultimately result in the optimizer selecting an evaluation plan that is orders of magnitude slower than another evaluation plan.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
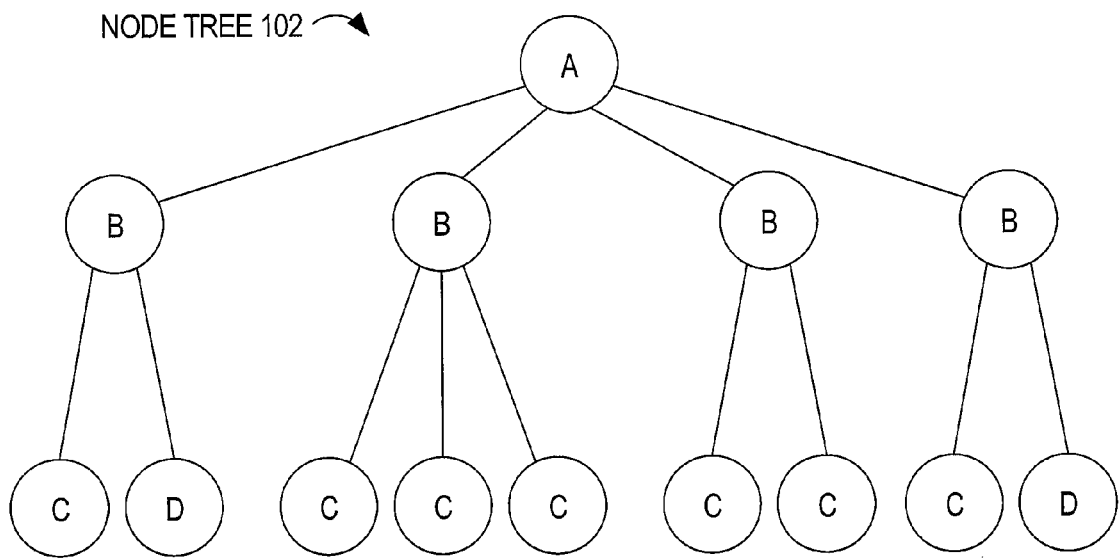
FIG. 1A is a diagram that depicts a node tree that corresponds to an example XML document, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for estimating the cost of a query. According to one technique, instead of assuming that each predicate in a query is independent of each other predicate, it is determined that two or more predicates in the query are correlated. Based on this determination, one set of one or more predicates is used to determine the selectivity of another set of one or more predicates.

According to a related technique, a single selectivity value is generated and associated with a group of predicates of a query instead of generating a separate selectivity value for each predicate in the group.

In either technique, the query may be an original query or a rewritten query.

Although the following description provides examples in the context of XML, embodiments of the invention are not so limited. Embodiments of the invention are also applicable to data that is not XML-based.

Similarly, although the following description provides examples using a path table as described above, embodiments of the invention are also applicable to tables that have a different schema.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Query Optimizer and Execution Plans

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation by a query optimizer.

The term query is used herein to refer to any form of representing a query, including a query in the form of a database statement or in the form of an internal query representation. A query optimizer may receive a query from another entity other than query parser, where the query received is in the form of an internal query representation.

A query optimizer generates one or more different candidate execution plans for a query. The query optimizer evaluates the one or more candidate execution plans to determine which should be used to compute the query.

Execution plans may be represented by a graph of interlinked nodes, referred to herein as operators, that each corresponds to a step of an execution plan, referred to herein as an execution plan operation. The hierarchy of the graphs (i.e., directed tree) represents the order in which the execution plan operations are performed and how data flows between each of the execution plan operations. Execution plan operations include, for example, a table scan, an index scan, hash-join, sort-merge join, nested-loop join, and filter.

A query optimizer may optimize a query by transforming the query. In general, transforming a query involves rewriting a query into another query that produces the same result and that can potentially be executed more efficiently, i.e. one for which a potentially more efficient and less costly execution plan can be generated. Examples of query transformation include view merging, subquery unnesting, filter predicate move-around and pushdown, common sub-expression elimination, outer-to-inner join conversion, materialized view rewrite, star transformation, and join predicate push down. A query is rewritten by manipulating a deep copy of the query representation to form a transformed query representation representing a transformed query. The query as transformed is referred to herein as the transformed query; the query whose copy is transformed is referred to as the base query.

A query optimizer may also perform more than one transformation for evaluation. Each transformed query generated for a query is referred to as a candidate transformed query or candidate query. A transformed query rewritten to generate another transformed query is referred to herein as a base query for the other transformed query. The query originally received by a query optimizer is referred to as the original query.

Cost Estimation

To evaluate the candidate execution plans in the search space, a query optimizer may estimate a cost of each candidate execution plan and compares the estimated query costs to select an execution plan for execution. In an embodiment, the estimated query cost is generated by a query cost estimator, which may be a component of a query optimizer. For a plan supplied by a query optimizer, a cost estimator computes and generates an estimated query cost. In general, the estimated query cost represents an estimate of computer resources expended to execute an execution plan. The estimated cost may be represented as the execution time required to execute an execution plan. To determine which candidate execution plan in the search space to execute, a query optimizer may select the candidate execution plan with the lowest estimated cost.

Synopsis

As mentioned previously, multiple predicates of a query may be (e.g., highly) correlated. This knowledge may be exploited to more accurately estimate the cost of executing the query. Relatively accurate estimation of correlated predicates requires statistics on the columns associated with the predicates. According to an embodiment of the invention, a collection of one or more XML documents is summarized into a synopsis that captures all rooted paths in the one or more XML documents. This is possible due to the hierarchical nature of the XML data model. Statistics for each node in the synopsis are stored. The following is an example XML document in which element B has at least a C child but may or may not have a D child.

```
<A>
    <B>
        <C>c1</C> <D>d1</D>
    </B>
    <B>
        <C>c2</C> <C>c3</C> <C>c4</C>
    </B>
    <B>
        <C>c5</C> <C></C>
    </B>
    <B>
        <C>c6</C> <D>d2</D>
    </B>
</A>
```

XML DOCUMENT EXAMPLE 1

FIG. 1A is a diagram that depicts a node tree 102 that corresponds to XML Document Example 1.

XML Document Example 1 is analyzed to gather statistics about each element, or each targeted element, in the document. From this analysis, a synopsis is generated. The following is an example synopsis of XML Document Example 1.

```
<A count="1" parent_cnt="1" children_cnt="4" descendants_cnt="13"
        text_cnt="0">
    <B count="4" parent_cnt="1" children_cnt="9"
            descendants_cnt="9" text_cnt="0">
        <C count="7" parent_cnt="4" children_cnt="0"
            descendants_cnt="0" text_cnt="6"/>
        <D count="2" parent_cnt="2" children_cnt="0"
            descendants_cnt="0" text_cnt="2"/>
    </B>
</A>
```

SYNOPSIS EXAMPLE 1

Figure 1B:
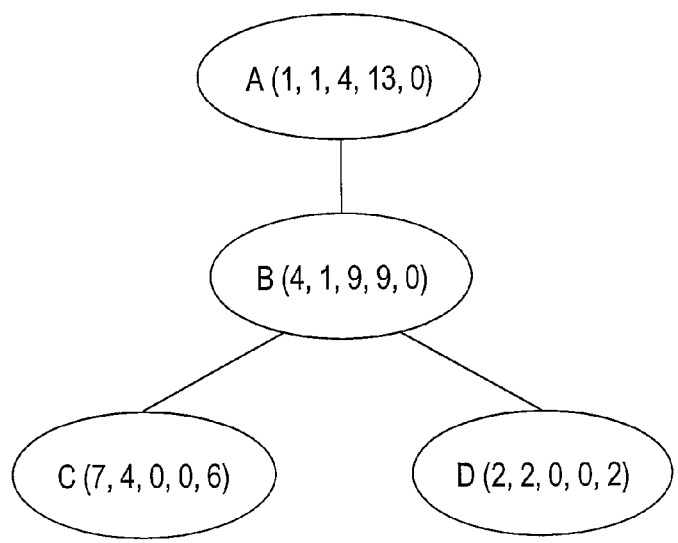
FIG. 1B is a diagram that depicts a node tree that corresponds to an example synopsis, according to an embodiment of the invention.

FIG. 1B is a diagram that depicts a synopsis tree 104 that corresponds to Synopsis Example 1. Synopsis tree 104 is described in more detail below.

Synopsis Example 1 preserves some information in XML Document Example 1. First, in a synopsis, such as Synopsis Example 1, most (if not all) rooted paths of a document are preserved.

Second, the number of elements that can be reached by each path in a document may be captured in a synopsis, e.g., using the attribute "count". For example, Synopsis Example 1 indicates that there are seven (7) elements under path/A/B/C and only two (2) elements under path/A/B/D.

Third, the cardinality of parent-child relationships in a document may be accurately captured in a synopsis, e.g., using the attribute "parent_cnt". For example, according to Synopsis Example 1, the parent_cnt of element D is two (2), which indicates that the number of parents (in this case element B) of the two (2) D elements is two (2). Based on this information, it is possible to derive that there are two (2) B elements that do not have a child element D (i.e., because there are four (4) B elements).

Fourth, the number of children and descendants of an element in a document may be captured in a synopsis, e.g., using the "children_cnt" and "descendants_cnt" attributes, respectively. According to Synopsis Example 1, element A has four (4) children and 13 descendants.

Fifth, the number of text nodes in a document may be captured in a synopsis, e.g., using the "text_cnt" attribute. According to Synopsis Example 1, each D element contains text, while all but one C element contains text.

Thus, each node in synopsis tree 104 corresponds to a different element in XML Document Example 1: element A, element B, element C, and element D. Also, each node contains information about the corresponding elements in XML Document Example 1. Thus, the root node in synopsis tree 104 corresponds to element A and contains the values 1, 1, 4, 13, and 0. The first value corresponds to the count attribute, the second value corresponds to the parent count attribute, the third element corresponds to the children count attribute, the fourth element corresponds to the descendant count attribute, and the fifth element corresponds to the number of text nodes.

With some of this information about XML Document Example 1, the combined selectivity of two or more predicates may be determined. Previously, the selectivity of certain predicates were either assigned default values or determined individually under the independence assumption.

Synopsis Storage

A synopsis may be stored and analyzed in various manners. For example, a synopsis may be stored and analyzed as a text document. As another example, a node tree, such as synopsis tree 104, may be generated from a text version of a synopsis to allow for relatively fast navigation of the synopsis.

As another example, a hash table may be generated from a text version of a synopsis where each element in the hash table is hashed by a particular value of the element, such as a path identifier of the element. With respect to XML Document Example 1, the path identifier of element D is IA/B/D. If an optimizer identifies that path identifier, then the path identifier is passed as a parameter in a hash function. The result of the hash function is a location in the hash table where synopsis information about element D (under path/A/B/D) is stored.

Whether stored as text, a node tree, and/or a hash table, a synopsis may be stored in volatile memory and/or non-volatile memory.

Example Query Costing

According to one known technique for estimating a cost of executing a query, default values are assigned to each order key predicate. The following example illustrates an independent assumption technique, where a query optimizer calculates the selectivity of each of order key predicate separately and subsequently multiplies them together.

The semantics of the WHERE-clause in the following SQL statement is to find the B and D element pairs such that D is a child of B.

| | |
|---|---|
| 1. | SELECT P1.order_key, P2.order_key |
| 2. | FROM PATHTABLE P1, PATHTABLE P2 |
| 3. | WHERE P1.rid = P2.rid AND |
| 4. | P1.pathid = PATHTOID('/A/B') AND |
| 5. | P2.pathid = PATHTOID('/A/B/D') AND |
| 6. | P2.order_key > P1.order_key AND |
| 7. | P2.order_key < SYS_ORDERKEY_ MAXCHILD(P1.order_key) AND |
| 8. | SYS_ORDERKEY_DEPTH(P1. order_key)+1 = SYS_ORDERKEY_DEPTH(P2.order_key) |

SQL STATEMENT EXAMPLE 1

In SQL Statement Example 1, there are two path identifier predicates (lines 4-5) and three order key predicates (lines 6-8). The three order key predicates ensure that element D is a child of element B and not a mere descendant of element B. For example, according to a pre-order traversal of XML Document Example 1 and/or node tree 102: (a) the order key value of element A is 1; (b) the order key values of elements B are, respectively, 1.1, 1.2, 1.3, and 1.4; and (c) the order key values of elements C and D that are children of the first B element are, respectively, 1.1.1 and 1.1.2.

The predicate at line 6 ensures that element D comes logically after element B in the corresponding XML document. When the predicates at lines 4-5 are true and the predicate at line 6 is applied to the first D element (1.1.2) and the first B element (1.1), the predicate at line 6 (1.1.2>1.1) is true.

The predicate at line 7 ensures that element D is not in a subtree that is logically subsequent to element B. In other words, the predicate at line 7 eliminates the (B, D) pairs where D is the "nephew" of B. If only the predicates at lines 6 and 8 were applied, then the second D element (in XML Document Example 1) would be considered a child of the first B element, which is incorrect. Therefore, the function SYS_ORDER-KEY_MAXCHILD(order_key1) is used to return a large value (e.g., ∞), such that it is greater than all descendants of order_key1 but less than the next sibling of order_key1. Thus, when the predicates at lines 4-5 are true and the predicate at line 7 is applied to the first D element (1.1.2) and the first B element (1.1), the predicate at line 7 (e.g., 1.1.2<1.1.∞) is true.

The predicate at line 8 ensures that element D is not a mere descendant of element B, but rather just one level "below" element D. The function SYS_ORDERKEY_DEPTH is used to return the depth of an element. In this case, the depth of each B element (in XML Document Example 1) is 2 and the depth of each D element is 3. When the predicates at lines 4-5 are true and the predicate at line 8 is applied to the first B element (depth of 2) and the first D element (depth of 3), the predicate at line 8 (2+1=3) is true.

In SQL Statement Example 1, the selectivity of the predicate at line 4 may be determined using Synopsis Example 1. From Synopsis Example 1, it is determined that the number of elements in XML Document Example 1 is 14 (e.g., "count" of element A+"descendants_cnt" of element A). Also from Synopsis Example 1, it is determined that the number of elements under the path/A/B is four (4) (e.g., "count" of element B). Thus, the selectivity of predicate P1.pathid=PATHTOID('/A/B') is 4/14.

Similarly, the selectivity of the predicate at line 5 (P2.pathid=PATHTOID('/A/B/D')) may be determined from Synopsis Example 1. The selectivity of this predicate is 2/14 because there are two (2) elements under the path/A/B/D.

The selectivity of the predicate at line 6 is 91/196 because there are 91 pairs of (P1,P2) that satisfy P2.order_key>P1.order_key. (The notation '(P1,P2)' signifies a join of P1 and P2.) Lastly, the selectivity of the predicates at lines 7-8 are, respectively, 127/196 and 40/196.

Each of these selectivity values may be calculated using statistics (e.g., from Synopsis Example 1) on the PATHID and ORDER_KEY columns. In this example, each predicate is completely accurate. However, each predicate is assumed to be independent of the other predicates. Because the query optimizer does not factor in the correlation between the PATHID and ORDER_KEY columns, the resulting selectivity is simply the multiplication of each selectivity value, which is 4/14*2/14*91/196*127/196*40/196=0.0025. The number of results of the query (which is also referred to as "cardinality estimation") may be calculated by multiplying the cardinality of the two input tables with the combined selectivity value. The result of this multiplication is 14*14*0.0025=0.49.

However, as can be seen from XML Document Example 1 (and node tree 102), there are actually two (2) pairs of B and D elements that satisfy parent-child relationships. Therefore, the error rate (which indicates a difference between an estimate cost and an actual cost) is |0.49−2|/2=75.5%. In many situations, this error rate is unacceptable. Potentially numerous other queries may have been ignored that, when executed, determine a valid result with a lower relative cost.

Query Costing Using Knowledge of Correlated Predicates

Instead of assuming that each predicate in a query is independent from every other predicate in the query, the knowledge that two or more predicates in a query are correlated is exploited to generate, in many cases, a more accurate estimated cost. Additionally or alternatively, instead of determining a separate selectivity value for each predicate, a single selectivity value is generated for and associated with a group of predicates. To be clear, this single selectivity value is not the result of multiplying individual selectivity values, as discussed previously.

In SQL Statement Example 1, it is determined that the ORDER_KEY column and the PATHID column, of the path table disclosed previously, are correlated. In contrast, for example, there tends to be no correlation between the PATHID column and the VALUE column. Due to the correlation determination, a single selectivity value is determined for the three predicates (i.e., at lines 6-8) on the ORDER_KEY columns, given the knowledge about the predicates on the PATHID columns (i.e., at lines 4-5). The selectivity values of the predicates (i.e., at lines 4-5) on the PATHID columns remains the same, i.e., 4/14 and 2/14 respectively. The selectivity value for the three predicates on the ORDER_KEY columns is calculated based on the PATHID conditions. For example, even though there are 91 pairs of (P1,P2) that satisfy P2.order_key>P1.order_key, by examining SQL Statement Example 1, it is determined that P1 is constrained to the elements under path/A/B and P2 is constrained to the elements under path/A/B/D. Synopsis Example 1 is used to determine that there are only 2 out of 8 pairs of (P1,P2) that satisfy the predicates at lines 6-8 whose semantics is that P2 is a child of P1. Therefore, the combined selectivity value of the entire WHERE-clause is 4/14*2/14*2/8=2/196. The cardinality of the entire query is, therefore, 14*14*2/196=2, which happens to be the correct value in this example. This cardinality may be used, in whole or in part, to estimate the cost of executing SQL Statement Example 1.

Another Example of Query Costing

Figure 2A:
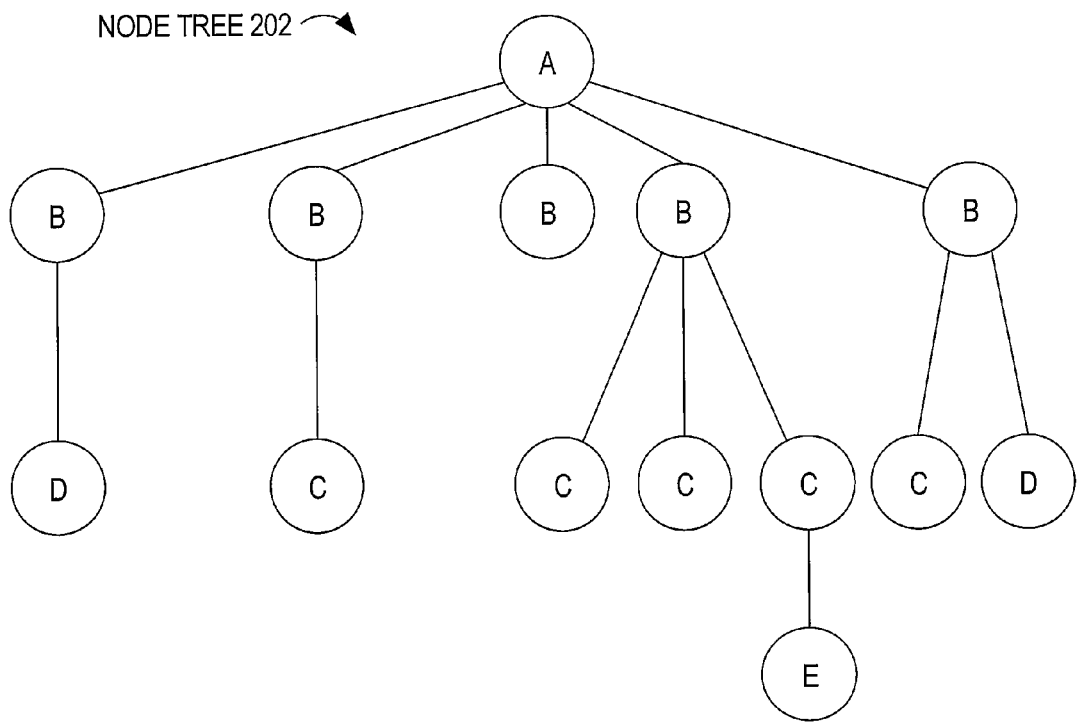
FIG. 2A is a diagram that depicts a node tree that corresponds to another example XML document, according to an embodiment of the invention.

FIG. 2A is a diagram that depicts a node tree 202 that corresponds to another XML document, referred to herein as XML Document Example 2. XML Document Example 2 is analyzed to gather statistics about each element, or each targeted element, in the document. From this analysis, a synopsis is generated. The following is an example synopsis of XML Document Example 2.

```
<A count="1" parent_cnt="1" children_cnt="5"
descedeants_cnt="13">
    <B count="5" parent_cnt="1" children_cnt="7"
    desendants_cnt="8">
        <C count="5" parent_cnt="3" children_cnt="1"
        descendants_cnt="1"/>
            <E count="1" parent_cnt="1" children_cnt="0"
            descendants_cnt="0"/>
        <D count="2" parent_cnt="2" children_cnt="0"
        descendants_cnt="0"/>
    </B>
</A>
```

SYNOPSIS EXAMPLE 2

In this example, XML Document Example 2 does not have any text nodes. Therefore, for purposes of brevity, the text_cnt attribute and corresponding value are omitted from Synopsis Example 2.

Figure 2B:
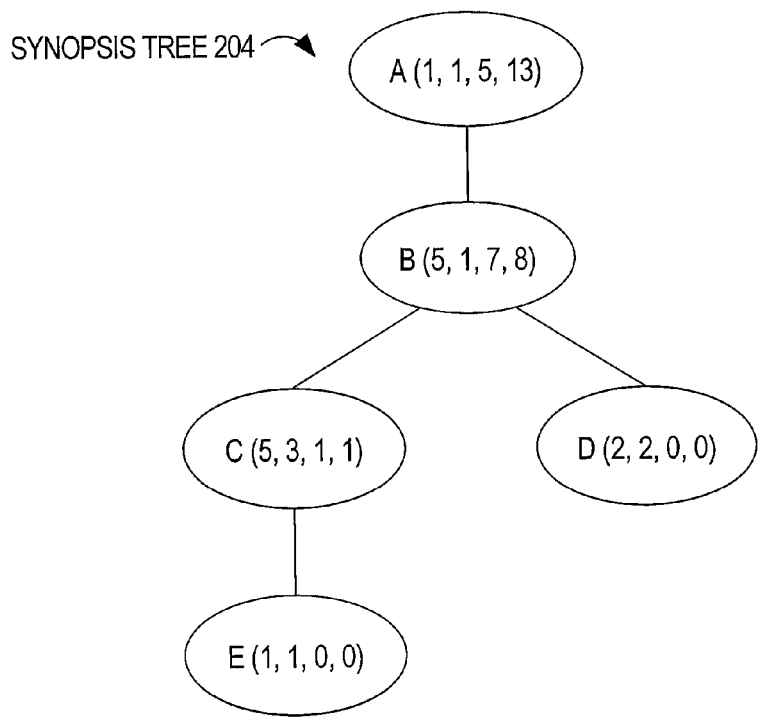
FIG. 2B is a diagram that depicts a node tree that corresponds to another example synopsis, according to an embodiment of the invention.

FIG. 2B is a diagram that depicts a synopsis tree 204 that corresponds to Synopsis Example 2. Similar to Synopsis Example 2, FIG. 2B omits the text_cnt value for each node in synopsis tree 204.

The semantics of the WHERE-clause in the following SQL statement is to find the B, C element couples such that element B has both children C and D.

| | |
|---|---|
| 1. | SELECT P1.order_key, P2.order_key, P3.order_key |
| 2. | FROM PATHTABLE P1, PATHTABLE P2 |
| 3. | WHERE P1.rid = P2.rid AND |
| 4. | P1.pathid = PATHTOID('/A/B') AND |
| 5. | P2.pathid = PATHTOID('/A/B/C') AND |
| 6. | P2.order_key > P1.order_key AND |
| 7. | P2.order_key < SYS_ORDERKEY_ MAXCHILD(P1.order_key) AND |
| 8. | SYS_ORDERKEY_DEPTH(P1.ORDER_KEY)+1 = SYS_ORDERKEY_DEPTH(P2.ORDER_KEY) AND |
| 9. | EXISTS( |
| 10. | SELECT null |
| 11. | FROM PATHTABLE p3 |
| 12. | WHERE P1.rid = P3.rid AND |
| 13. | P3.pathid = PATHTOID('/A/B/D') AND |

| | |
|---|---|
| 14. | P3.order_key > P1.order_key AND |
| 15. | P3.order_key < |
| | SYS_ORDERKEY_MAXCHILD(P1.order_key) AND |
| 16. | SYS_ORDERKEY_DEPTH(P1.order_key)+1 = SYS_ORDERKEY_DEPTH(P3.order_key)) |

SQL STATEMENT EXAMPLE 2

Because it is known that the PATHID and ORDER_KEY columns of the path table are correlated, a single selectivity values is determined for the set of three order key predicates at lines 6-8.

Based on Synopsis Example 2, it is determined that the selectivity values of the predicates (i.e., at lines 4-5) on the PATHID columns are, respectively, 2/14 and 5/14.

The selectivity value for the three predicates on the ORDER_KEY columns at lines 6-8 is calculated based on the PATHID conditions. For example, it is determined that P1 is constrained to the elements under path/A/B and P2 is constrained to the elements under path/A/B/C. Synopsis Example 2 is used to determine that there are 5 out of 25 pairs of (P1,P2) that satisfy the predicates at lines 6-8 whose semantics is that P2 is a child of P1.

The semantics of subquery 9-16 is to filter out all B elements that have no child D element. The selectivity of the whole subquery may be determined, from Synopsis Example 2, by the number of B elements that have a D child. Then, the percentage of B elements that have a child D element is 2/5 (e.g., "parent_cnt" of element D is 2/"count" of element B).

If it is assumed that the selectivity of a subquery is independent of the other predicates (i.e., the fact that element B has a child D is independent on whether B also has a child C), then all these selectivities are multiplied together to generate the combined selectivity value of the entire WHERE-clause: 2/14*5/14*5/25*2/5=100/24500. The estimated cardinality of the entire query is, therefore, 14*14*100/24500=4/5. The actual cardinality of the query is one (1) because only one B element has both a C element and a D element as children. The estimation error (|4/5−1|/1=0.2), which is due to the independence assumption of C and D as the children of B, is relatively small. This estimation error is, however, a significant improvement over the estimation error that is due to not considering the correlations between the PATHID and ORDER_KEY columns. This calculated cardinality may be used, in whole or in part, to estimate the cost of executing SQL Statement Example 2.

In addition to the child axis and predicates referred to in the examples above, path expressions may also include node tests, other axis specifiers (e.g., ancestor, descendant-or-self), and functions and operators as specified in XPath 2.0. Embodiments of the invention may be used with path expressions that include these additional features as long as a synopsis, or similar statistics, is maintained that allows the selectivity associated with the query predicates to be evaluated.

Hardware Overview

Figure 3:
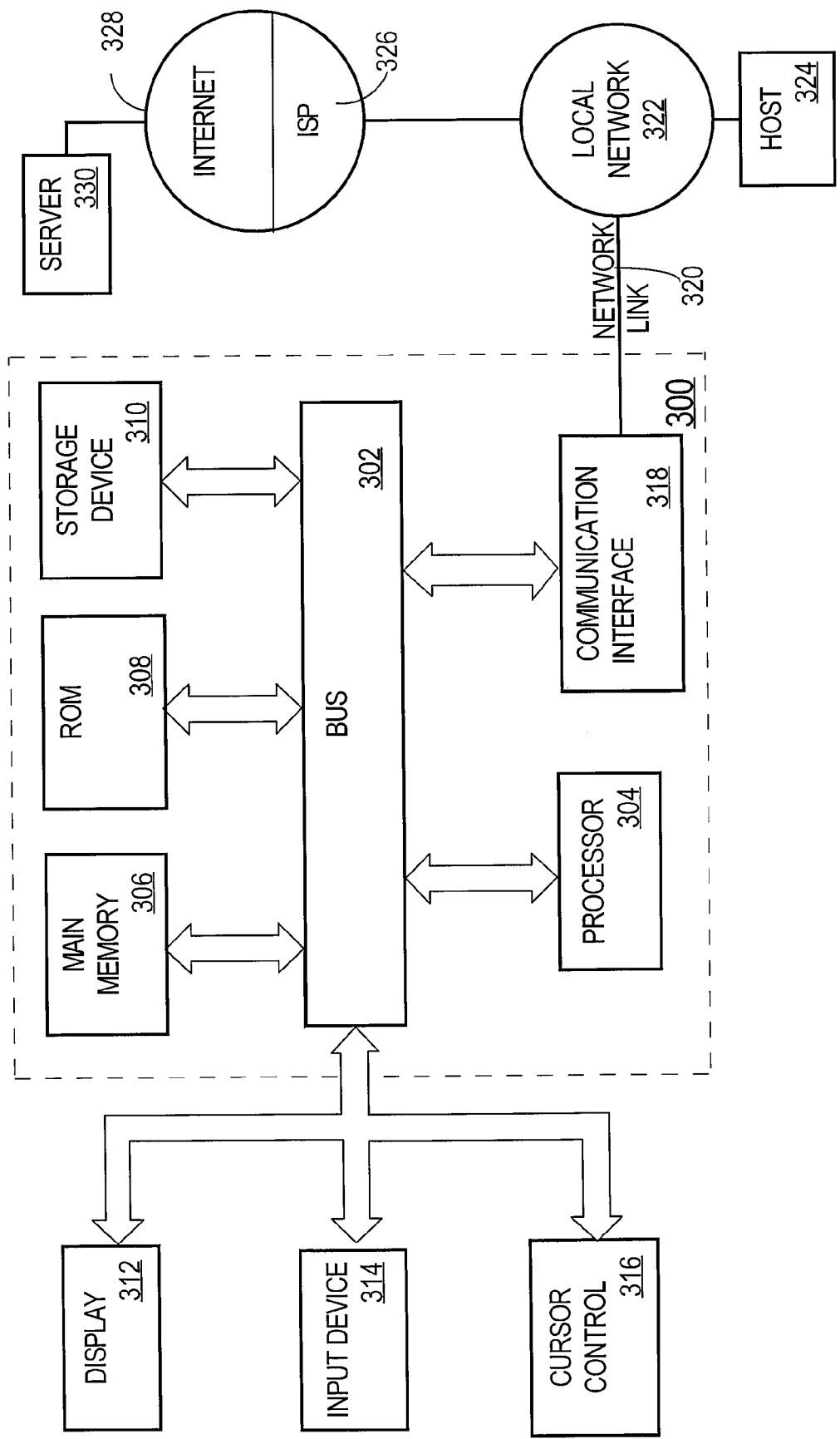
FIG. 3 is a block diagram that depicts a computer system upon which an embodiment of the invention may be implemented.

FIG. 3 is a block diagram that depicts a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    storing summary data that (a) specifies a number of each element of a plurality of elements of an XML document that is part of XML data and (b) indicates a hierarchical relationship among the plurality of elements;
    identifying, in a particular query that targets a portion of the XML data, a plurality of predicates that comprises a first subset and a second subset that is different than the first subset;
    analyzing the summary data based on the first subset of the plurality of predicates;
    determining that at least a first predicate in the first subset of the plurality of predicates is correlated with a second predicate in the second subset of the plurality of predicates;
    in response to determining that the first predicate is correlated with the second predicate, generating a single selectivity value based on the first subset of the plurality of predicates, one or more predicates that do not belong to the first subset of the plurality of predicates, and the summary data;
    associating the single selectivity value with the first subset of the plurality predicates; and
    estimating, based on the single selectivity value, a cost of executing the particular query;
    wherein the method is performed by one or more computing devices.

2. The method of claim 1, wherein:
    the method further comprising, for each predicate, in the second subset of the plurality of predicates, generating another selectivity value; and
    estimating the cost includes estimating the cost based on the other selectivity value(s).

3. The method of claim 1, further comprising:
    receiving an initial query; and
    generating, based on the initial query, a set of one or more subsequent queries, wherein the set of one or more subsequent queries includes the particular query.

4. The method of claim 3, further comprising, if the particular query is associated with the lowest cost relative to other queries in the set of one or more subsequent queries, then executing the particular query.

5. The method of claim 1, wherein generating the single selectivity value includes generating the single selectivity value based on semantics of the first subset of the plurality of predicates.

6. The method of claim 1, wherein the first subset of the plurality of predicates corresponds to a column of a table.

7. The method of claim 6, wherein:
    the table is a path table of an XML index; and
    the column identifies, for each row in the table, a unique order key value for an XML element that corresponds to said each row.

8. The method of claim 6, wherein the column is correlated with another column of the table, wherein the other column corresponds to one or more predicates in the second subset of the plurality of predicates.

9. The method of claim 1, wherein the second predicate indicates a particular path in the XML data and the first subset of the plurality of predicates are constrained to elements under the particular path.

10. The method of claim 1, wherein the first subset of the plurality of predicates includes multiple predicates.

11. A method for estimating a cost of executing a query that targets a portion of XML data, the method comprising:
storing summary data that is separate from the XML data and that indicates (a) a number of each element of a plurality of elements of an XML document that is part of the XML data and (b) a hierarchical relationship among the plurality of elements;
identifying a plurality of predicates in the query, wherein the plurality of predicates includes a first set of one or more predicates and a second set of one or more predicates that are different than the first set of predicates;
generating, based on the first set of predicates and the summary data, a first selectivity value;
determining whether the first set of predicates is correlated with the second set of predicates;
in response to determining that the first set of predicates is correlated with the second set of predicates, generating, based on the second set of predicates and the first set of predicates, a second selectivity value; and
estimating, based on the first selectivity value and the second selectivity value, a cost of executing the query;
wherein the method is performed by one or more computing devices.

12. The method of claim 11, wherein:
the first set of predicates corresponds to a first column of a table;
the second set of predicates corresponds to a second column of the table; and
the second column is different than the first column.

13. The method of claim 12, wherein:
an XML index includes the table;
the first column is a path identifier column;
the second column is an order key value column;
the path identifier column identifies, for each row in the table, a path identifier for an XML element that corresponds to said each row; and
the order key value column identifies, for each row in the table, a unique order key value for an XML element that corresponds to said each row.

14. The method of claim 11, wherein determining that the first set of predicates is correlated with the second set of predicates includes determining, based on the first set of predicates, that a variable reference in the second set of predicates is constrained to certain values.

15. The method of claim 14, wherein determining that the variable reference in the second set of predicates is constrained to certain values comprises determining that the variable reference in the second set of predicates is constrained to elements under a particular path indicated in the query.

16. The method of claim 11, further comprising:
receiving XML data that comprises a plurality of XML elements; and
analyzing the XML data to generate statistics about the XML data,
wherein:
the statistics indicate a hierarchical relationship among the plurality of XML elements,
the statistics include a number of a particular XML element of the plurality of XML elements and a number of parent elements of the particular XML element, and
generating the second selectivity value is also based on the statistics.

17. One or more non-transitory storage media storing instructions which, when executed by one or more processors, cause:
storing summary data that (a) specifies a number of each element of a plurality of elements of an XML document that is part of XML data and (b) indicates a hierarchical relationship among the plurality of elements;
identifying, in a particular query that targets a portion of the XML data, a plurality of predicates that comprises a first subset and a second subset that is different than the first subset;
analyzing the summary data based on the first subset of the plurality of predicates;
determining that at least a first predicate in the first subset of the plurality of predicates is correlated with a second predicate in the second subset of the plurality of predicates;
in response to determining that the first predicate is correlated with the second predicate, generating a single selectivity value based on the first subset of the plurality of predicates, one or more predicates that do not belong to the first subset of the plurality of predicates, and the summary data;
associating the single selectivity value with the first subset of the plurality predicates; and
estimating, based on the single selectivity value, a cost of executing the particular query.

18. The one or more non-transitory storage media of claim 17, wherein:
the instructions, when executed by the one or more processors, further cause, for each predicate in the second subset of the plurality of predicates, generating another selectivity value; and
estimating the cost includes estimating the cost based on the other selectivity value(s).

19. The one or more non-transitory storage media of claim 17, wherein the instructions, when executed by the one or more processors, further cause:
receiving an initial query; and
generating, based on the initial query, a set of one or more subsequent queries, wherein the set of one or more subsequent queries includes the particular query.

20. The one or more non-transitory storage media of claim 19, wherein the instructions, when executed by the one or more processors, further cause, if the particular query is associated with the lowest cost relative to other queries in the set of one or more subsequent queries, then executing the particular query.

21. The one or more non-transitory storage media of claim 17, wherein generating the single selectivity value includes generating the single selectivity value based on semantics of the first subset of the plurality of predicates.

22. The one or more non-transitory storage media of claim 17, wherein the first subset of the plurality of predicates correspond to a column of a table.

23. The one or more non-transitory storage media of claim 22, wherein:
the table is a path table of an XML index; and
the column identifies, for each row in the table, a unique order key value for an XML element that corresponds to said each row.

24. The one or more non-transitory storage media of claim 22, wherein the column is correlated with another column of the table, wherein the other column corresponds to one or more predicates in the second subset of the plurality of predicates.

25. The one or more non-transitory storage media of claim 17, wherein the second predicate indicates a particular path in the XML data and the first subset of the plurality of predicates are constrained to elements under the particular path.

26. The one or more non-transitory storage media of claim 17, wherein the first subset of the plurality of predicates includes multiple predicates.

27. One or more non-transitory storage media storing instructions for estimating a cost of executing a query that targets a portion of XML data, wherein the instructions, when executed by one or more processors, cause:

storing summary data that is separate from the XML data and that indicates (a) a number of each element of a plurality of elements of an XML document that is part of the XML data and (b) a hierarchical relationship among the plurality of elements;

identifying a plurality of predicates in the query, wherein the plurality of predicates includes a first set of one or more predicates and a second set of one or more predicates that are different than the first set of predicates;

generating, based on the first set of predicates and the summary data, a first selectivity value;

determining whether the first set of predicates is correlated with the second set of predicates;

in response to determining that the first set of predicates is correlated with the second set of predicates, generating, based on the second set of predicates and the first set of predicates, a second selectivity value; and estimating, based on the first selectivity value and the second selectivity value, a cost of executing the query.

28. The one or more non-transitory storage media of claim 27, wherein:

the first set of predicates corresponds to a first column of a table;

the second set of predicates corresponds to a second column of the table; and the second column is different than the first column.

29. The one or more non-transitory storage media of claim 28, wherein:

an XML index includes the table;

the first column is a path identifier column;

the second column is an order key value column;

the path identifier column identifies, for each row in the table, a path identifier for an XML element that corresponds to said each row; and the order key value column identifies, for each row in the table, a unique order key value for an XML element that corresponds to said each row.

30. The one or more non-transitory storage media of claim 27, wherein determining that the first set of predicates is correlated with the second set of predicates includes determining, based on the first set of predicates, that a variable reference in the second set of predicates is constrained to certain values.

31. The one or more non-transitory storage media of claim 30, wherein determining that the variable reference in the second set of predicates is constrained to certain values comprises determining that the variable reference in the second set of predicates is constrained to elements under a particular path indicated in the query.

32. The one or more non-transitory storage media of claim 27, wherein the instructions, when executed by the one or more processors, further cause:

receiving data that comprises a plurality of elements; and analyzing the data to generate statistics about the data, wherein:

the statistics indicate a hierarchical relationship among the plurality of elements, the statistics include a number of a particular element of the plurality of elements and a number of parent elements of the particular element, and generating the second selectivity value is also based on the statistics.

* * * * *